United States Patent Office 3,565,741
Patented Feb. 23, 1971

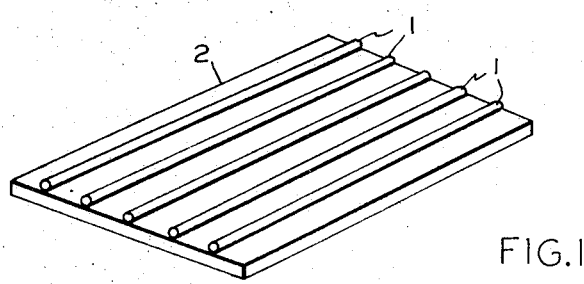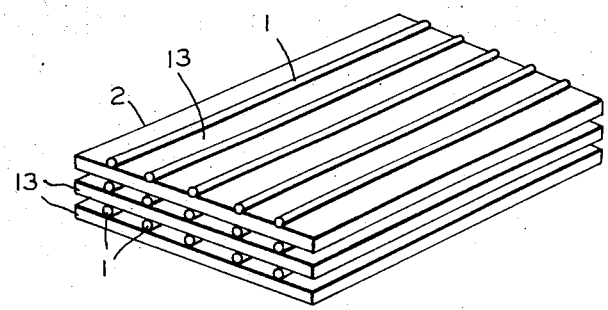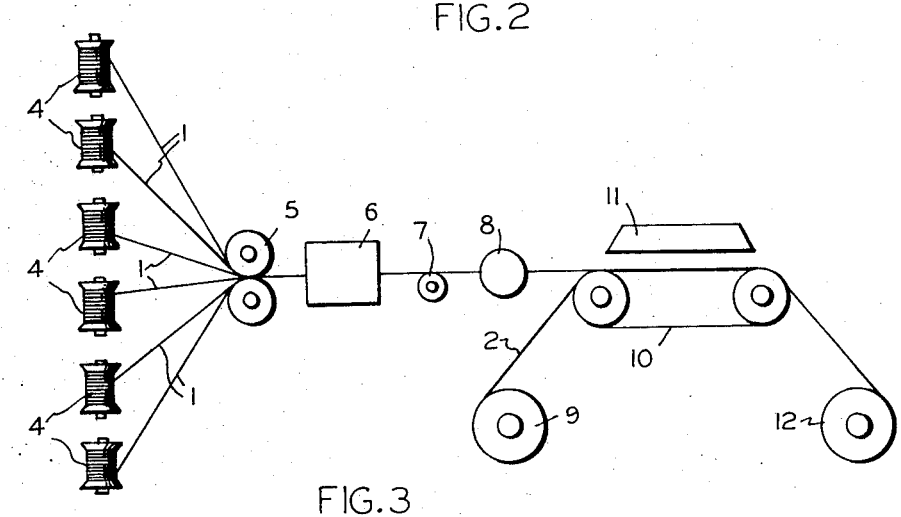

3,565,741
REINFORCED SYNTHETIC RESIN PRODUCTS
Francis F. Jaray, Peak Cottage, Kingswood Lane,
Martley, Worcester, England
Continuation of application Ser. No. 779,556, Nov. 27,
1968, which is a continuation-in-part of application Ser.
No. 370,496, May 27, 1964. This application Jan. 22,
1970, Ser. No. 6,020
Int. Cl. B32b 5/12
U.S. Cl. 161—60                                     5 Claims

ABSTRACT OF THE DISCLOSURE

A reinforcement material comprising a plurality of fine uncrimped wires bonded to the surface of a supporting base of a fabric or transversely disposed spaced fibers, just sufficient adhesive being used to wet the underside of the wires where it contacts the supporting base so that the material is useful for the production of reinforced synthetic resin sheets, tubes and other shaped articles.

---

This application is a continuation of Ser. No. 779,556 filed Nov. 27, 1968, now abandoned, which is a continuation-in-part of the application Ser. No. 370,496, filed on May 27, 1964 and now abandoned.

This invention is for improvements in or relating to reinforcement material and has for an object to provide an improved reinforcement material for use in connection with the production of reinforced synthetic products such as sheets, tubes and other shaped articles.

According to the present invention there is provided a reinforcement material for use in the production of reinforced synthetic resin sheets, tubes and other shaped articles which comprise a plurality of fine, straight wires in long lengths laid parallel and closely adjacent to one another upon and so bonded to an elongated web of a supporting base of a fabric of the class consisting of woven, non-woven and bonded cloths or a supporting base of transversely-disposed spaced fibers as to remain straight and free from crimping. The wire used can be hard drawn or soft steel wire, aluminum, bronze or nickel alloys, all depending on the final purpose of the laminate.

It will be appreciated that the invention essentially provides for reinforcement material in which the reinforcement is constituted by fine wires which preferably have a diameter in the range of from $\frac{1}{1000}$ to $\frac{50}{1000}$ of an inch which are oriented unidirectionally in long lengths and are straight and free from crimping. It will be understood, of course, that where the finished article is required to exhibit tensile strength, this property would be greatly reduced if the reinforcement could itself stretch appreciably or if it were itself not straight since clearly if the reinforcing wires were crimped in any way on the application of a tensile stress to the synthetic resin article in which the crimped wires were incorporated, there would be a loss of effectiveness of the wire reinforcement by reason of the fact that the wire would not contribute to the strength of the reinforced synthetic resin article until the article had been stretched to such an extent as to straighten out all the crimps in the wire.

A feature of the invention consists in that the wires are bonded to the supporting base by means of a synthetic resin adhesive.

In the embodiment of the invention in which the supporting base is constituted by transversely disposed spaced fibers, the fibers are preferably disposed at an angle of approximately 90° to the axis of the parallel wires, and are cemented to the parallel wires by an adhesive. Examples of fibers are nylon, polypropylene, polyethylene terephthalate, polyethylene and similar materials. Such a combination of wires in one direction and synthetic resin fibers in the other direction will give a particularly soft and drapable reinforcing material which will eagerly accept a bonding and laminating resin. Molding with such material need not require high temperature and pressures.

It is clear that a layer of synthetic resin cross fibers can be bonded on its underside to a layer of parallel wires and on its upper side to another layer which may or may not run at an angle to the lower layer of wires. Indeed it is possible to build up quite a thick reinforcing system in this way by alternating layers of parallel wires and synthetic resin cross fibers. This may for a number of purposes be of great importance though, of course, such a pile of layers would not show any draping properties.

It will, of course, be understood that in addition to the thermoplastic synthetic resin fibers there may be used glass fibers and that all of these fibers, whether glass or synthetic resin, may be used in the production of a woven, non-woven or bonded cloth.

Among the synthetic resin adhesives which can be employed, there may be mentioned polyester resins or epoxy resins. The resin is used in the smallest possible amounts, just sufficient to wet the underside of the wire where it contacts the supporting base.

The reinforcement material in accordance with the present invention can most conveniently be made by a method which comprises collecting a plurality of fine uncrimped wires from bobbins carrying said wires, feeding said wires under tension and in parallel, closely-spaced relationship on to the surface of a supporting base of a fabric of the class consisting of woven cloths, non-woven cloths, bonded cloths, or a supporting base of transversely disposed spaced fibers, and bonding said wires to the surface of said supporting base by applying just sufficient adhesive to wet the underside of each wire where it contacts the surface of the supporting fabric.

The invention also includes the formation of reinforced synthetic resin articles which comprises applying a synthetic resin to the reinforcement material hereinbefore described and shaping the synthetic resin and the reinforcement to the desired shape.

The invention will be more particularly described with reference to the accompanying drawings in which:

FIG. 1 illustrates a preferred form to the reinforcement material,

FIG. 2 illustrates a laminate according to the invention, and

FIG. 3 illustrates schematically a preferred method of forming the reinforcement material of FIG. 1.

As illustrated in FIG. 1, the reinforcement material according to the present invention comprises a plurality of fine straight uncrimped wires 1 in long lengths laid parallel and in closely-spaced relationship to one another upon and bonded to the surface of a supporting base 2.

FIG. 2 illustrates a composite structure according to the invention comprising a plurality of layers, a top layer comprising fine wires 1 bonded to a supporting fabric 2 and superimposed upon a second layer 3, which is formed in a similar manner to the top layer, a third layer, etc.

In a preferred method of making the reinforcement material according to the invention, a conveyor belt is utilized for forming continuous lengths of reinforcement material and a typical embodiment is illustrated schematically in FIG. 3.

In this illustrated embodiment, a plurality of fine wires 1, are bonded to a continuous length of supporting fabric 2. The wires are fed from a number of spools or bobbins 4, and are drawn under tension through one or more guides 5, whereby they are guided into parallel, closely spaced relationship to each other.

The wires are then passed through a polishing bath, a wiper and a de-greasing bath, all illustrated schematically by block 6 in the drawing. The clean and polished wires are then coated on their underside with a suitable adhesive or binder, for example a synthetic resin adhesive. Thus, after leaving the de-greasing bath, the wires travel over a resin dispenser, illustrated schematically as a roller 7, which will coat the underside of the wires with a predetermined amount of adhesive, just sufficient to wet the underside of each wire where it will subsequently contact the supporting fabric.

From the resin dispenser the wires travel through a comb or other wire guide 8 which will keep the wires at the distance from each other at which they have to be deposited on the supporting fabric.

The supporting fabric is fed from a feed roller 9, onto a conveyor 10, which may preferably be a steel band conveyor. The layer of supporting fabric on the conveyor is followed immediately by the parallel wires having their underside wetted with adhesive. The speed of the conveyor is determined by the desired output and the required curing time for the resin adhesive. In order to facilitate and accelerate the setting of the adhesive, the upper part of the conveyor is preferably enclosed in an oven 11 which may be, for example, of the infra-red or air-circulating type.

The continuous length of reinforcement material leaving the conveyor is wound onto a take-up roller 12.

Those reinforcement materials in which all of the wires run in one direction only are capable of being wrapped round mandrels for the production of pipes, vessels, rocket motors, pressure containers and many others. Such vessels will show a very high strength to weight ratio at costs which are economically quite bearable.

In cases where such laminates, especially those wound round mandrels, have to be subjected to attack by corrodants, an inner liner made from other resins and preferably applied on the mandrel before the winding with the wire reinfocement will protect the wires. Such covering or linings have proved themselves to be particularly successful if they are made from epoxy resin, bisphenol A polyester resins, furan resins or furan/phenol co-condensates, or a whole range of thermoplastic materials such as polyvinyl chloride polyethylene, polypropylene, chlorinated polyether resins or fluorinated resins.

I claim:
1. A reinforced synthetic resin product selected from the group consisting of sheets, tubes and other shaped articles wherein the improvement comprises a reinforcement material, which consists essentially of a plurality of fine straight uncrimped wires of long lengths disposed in parallel and in closely-spaced relationship to one another, a supporting base of a fabric of the class consisting of woven cloths, non-woven cloths and bonded cloths, said plurality of wires lying upon the surface of said supporting base, and adhesive means for bonding the wires to said base, said supporting base and said supporting wires being impregnated with a curable plastic material, whereby said wires and said supporting base may be formed into desired configuration and the plastic material thereafter cured to retain said formed wires and said supporting base in the form of said desired configuration.

2. A reinforced product according to claim 1 wherein the wires of the reinforcement material are bonded to the supporting base by means of a synthetic resin adhesive.

3. A reinforced product according to claim 1 wherein the wires of the reinforcement material have a diameter in a range of from 1 to 50 thousands of an inch.

4. A reinforced product according to claim 1 wherein the wires of the reinforcement material are steel.

5. A reinforced synthetic resin product wherein the improvement comprises a multi-layer reinforcement material comprising a composite mat formed from a plurality of layers of reinforcement material superposed upon one another and bonded together, each layer consisting essentially of a plurality of fine straight uncrimped wires in long lengths disposed in parallel and in closely-spaced relationship to one another, a supporting base of a fabric of the class consisting of woven cloths, non-woven cloths and bonded cloths, said plurality of wires lying upon the surface of said supporting base, and adhesive means for bonding said wires to said base, said reinforcement material being impregnated with a curable plastic material, whereby said wires and said supporting base may be formed into desired configuration and the plastic material thereafter cured to retain said formed wires and said supporting base in the form of said desired configuration.

References Cited
UNITED STATES PATENTS

| | | | |
|---|---|---|---|
| 2,495,808 | 1/1950 | Colmant | 161—78X |
| 2,713,551 | 7/1955 | Kennedy | 161—78X |
| 3,087,699 | 4/1963 | Foster | 161—55 |
| 3,101,290 | 8/1963 | Paul | 161—36X |
| 3,307,992 | 3/1967 | Condon et al. | 161—143X |

ROBERT F. BURNETT, Primary Examiner

R. L. MAY, Assistant Examiner

U.S. Cl. X.R.

161—78, 143